(12) United States Patent
He et al.

(10) Patent No.: US 10,272,845 B2
(45) Date of Patent: Apr. 30, 2019

(54) AUTOMOBILE BLUETOOTH RECEIVER

(71) Applicant: Shenzhen Thousandshores Technology Co., Ltd., Shenzhen, Guangdong (CN)

(72) Inventors: Ding He, Guangdong (CN); Zhi Liu, Guangdong (CN)

(73) Assignee: Shenzhen Thousandshores Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/744,868

(22) PCT Filed: Aug. 2, 2017

(86) PCT No.: PCT/CN2017/095705
§ 371 (c)(1),
(2) Date: Jan. 15, 2018

(65) Prior Publication Data
US 2019/0039528 A1 Feb. 7, 2019

(51) Int. Cl.
| | | |
|---|---|---|
| *H02J 7/00* | (2006.01) | |
| *H02J 7/14* | (2006.01) | |
| *H04B 1/08* | (2006.01) | |
| *H04M 1/60* | (2006.01) | |
| *H04W 4/48* | (2018.01) | |
| *H04W 4/80* | (2018.01) | |
| *B60R 11/02* | (2006.01) | |

(Continued)

(52) U.S. Cl.
CPC ............ *B60R 11/02* (2013.01); *B60R 16/033* (2013.01); *H02J 7/0068* (2013.01); *H02J 7/14* (2013.01); *H04B 1/082* (2013.01); *H04B 1/3822* (2013.01); *H04L 67/12* (2013.01); *H04M 1/6091* (2013.01); *H04W 4/48* (2018.02); *H04W 4/80* (2018.02); *H04M 2250/02* (2013.01)

(58) Field of Classification Search
CPC ....... B60R 11/02; B60R 16/033; H04L 67/12; H04M 1/6091; H04M 2250/02; H04W 4/48; H04W 4/80; H02J 7/0068; H02J 7/14; H04B 1/082; H04B 1/3822
See application file for complete search history.

(56) References Cited

U.S. PATENT DOCUMENTS

| | | | |
|---|---|---|---|
| 7,400,859 B2 * | 7/2008 | Dayan ................... | H04B 1/034 341/155 |
| 2008/0227426 A1 * | 9/2008 | Lin ..................... | B60R 11/0247 455/345 |

(Continued)

*Primary Examiner* — Brandon J Miller

(57) ABSTRACT

Disclosed is an automobile Bluetooth receiver, which includes a Bluetooth receiver and an automobile charger for plugging the Bluetooth receiver therein. The Bluetooth receiver includes a receiver housing, a Bluetooth receiver module, a rechargeable battery, a switch, a first magnetic element and a plug. The rechargeable battery is electrically connected to the Bluetooth receiver module, and the plug is electrically connected to the Bluetooth receiver module and the rechargeable battery. The automobile charger includes an automobile charger housing, a PCB, and a second magnetic element attachable to the first magnetic component; and the automobile charger housing has a plug hole formed thereon and disposed proximate to a side of the receiver housing for receiving a plug and the plug is plugged into the plug hole and electrically coupled to the PCB. This disclosure improves the reliability of the charging and the convenience of use.

10 Claims, 3 Drawing Sheets

(51) Int. Cl.
*H04L 29/08* (2006.01)
*B60R 16/033* (2006.01)
*H04B 1/3822* (2015.01)

(56) References Cited

U.S. PATENT DOCUMENTS

2010/0210314 A1* 8/2010 Wang ............... H01R 24/58
455/569.1
2011/0148352 A1* 6/2011 Wang ............... B60R 11/0241
320/108

* cited by examiner

AUTOMOBILE BLUETOOTH RECEIVER

FIELD OF THE INVENTION

The present disclosure relates to the field of Bluetooth technology, in particular to an automobile Bluetooth receiver.

BACKGROUND OF THE INVENTION

As Bluetooth technology advances, there are various different Bluetooth products or built-in Bluetooth modules for electronic products on the market. As to the built-in Bluetooth module, the power is supplied from the electronic products. For a standalone Bluetooth receiver such as an automobile Bluetooth receiver, the receiver generally comes with a USB data interface and a data line provided for supplying power required for the operation of the electronic products. The Bluetooth receiver occupies some of the limited data interface and needs to be connected through a cable. Obviously, such Bluetooth receiver is inconvenient for charging and use.

Obviously, the conventional Bluetooth receiver requires improvements.

SUMMARY OF THE INVENTION

Therefore, it is a primary objective of the present disclosure to provide a novel automobile Bluetooth receiver to overcome the aforementioned drawbacks of the prior art.

To achieve the aforementioned and other objectives, the present disclosure provides an automobile Bluetooth receiver comprising a Bluetooth receiver, and an automobile charger provided for plugging the Bluetooth receiver therein.

The Bluetooth receiver comprises a receiver housing having an accommodating space formed therein, a Bluetooth receiver module and a rechargeable battery installed in the receiver housing, a switch installed onto the receiver housing, and a first magnetic component and a plug installed at the bottom of the receiver housing, wherein the rechargeable battery is electrically coupled to the Bluetooth receiver module, and the plug is electrically coupled to the Bluetooth receiver module and the rechargeable battery.

The automobile charger comprises an automobile charger housing having an accommodating space formed therein, a PCB with a charging circuit installed in the automobile charger housing, and a second magnetic component installed in the automobile charger housing and attachable to the first magnetic component; and the automobile charger housing has a plug hole formed thereon and disposed proximate to a side of the receiver housing for receiving a plug, and the plug is plugged into the plug hole and electrically coupled to the PCB.

In an embodiment, the plug is disposed at the middle of the bottom of the receiver housing, and the first magnetic component is disposed on both sides of the plug separately.

In an embodiment, the first magnetic component includes two magnetic columns protruded from the bottom of the receiver housing, and the second magnetic component is disposed at the bottom of the plug hole.

In an embodiment, the plug hole has a diameter decreasing gradually in a direction towards the interior of the automobile charger housing.

In an embodiment, the plug hole has a stair formed on an inner wall of the plug hole.

In an embodiment, the receiver housing comprises a cylindrical body with two end openings, a top casing and a bottom casing, disposed at both ends of the cylindrical body separately, and the top casing has a snap claw extending towards a side of the bottom casing, and the bottom casing has a snap hole formed thereon and configured to be corresponding to the snap claw.

In an embodiment, the top casing has a through hole formed thereon, and the switch is partially exposed from the through hole.

In an embodiment, a pad is installed between the top casing and the rechargeable battery.

In an embodiment, the automobile charger housing comprises an automobile charger chassis with an opening at an end of the automobile charger chassis, and an automobile charger top casing covered onto the automobile charger chassis, and the automobile charger top casing has a snap claw formed on a side thereof and disposed proximate to the PCB, and the PCB has a snap position for latching the snap claw.

In an embodiment, the PCB has at least one charging interface formed thereon; and the automobile charger chassis has a hole element for exposing the charging interface.

The technical solution of this disclosure includes a Bluetooth receiver and an automobile charger for plugging the Bluetooth receiver therein. When the Bluetooth receiver is detached, the Bluetooth receiver may be plugged and connected directly to an output device without the Bluetooth function, so that the output device has the Bluetooth function to achieve the effects of listening music and making hand-free telephones. When both of the Bluetooth receiver and the automobile charger are plugged, a wireless charging can be accomplished. During the charging process, both of the Bluetooth receiver and the automobile charger can be positioned more securely by a magnetic effect, so as to achieve a reliable charging effect and a convenient use.

BRIEF DESCRIPTION OF THE DRAWINGS

The above and other objects, features and advantages of this disclosure will become apparent from the following detailed description taken with the accompanying drawings. Only some embodiments of the present disclosure have been illustrated in the drawings, but it should be pointed out that many other modifications are conceivable within the scope of the following claims.

The objectives, features, and advantages of the present disclosure are described and illustrated together with the related drawings as follows.

DESCRIPTION OF ILLUSTRATED EMBODIMENTS

It should be understood that the terms used in this specification and claims such as "first" and "second" are provided for the purpose of illustrating this disclosure, but not intended for indicating or implying their relative importance or indicating the quantity of a specific element. Therefore, the characteristic with the limitation of the "first" or "second" may indicate or imply the characteristic of having at least one element. In addition, the technical solutions of different embodiments may be combined, but such combination must be able to be implemented by persons having ordinary skill in the art. Such combination will be considered to be non-existent if it is contradictory or unable to be implemented and is not to be covered in the scope of the present disclosure.

The following description combines the drawings of the embodiments of the present disclosure to clearly and fully describe the technical characteristics of the embodiments of the present disclosure. Obviously, these embodiments just include some of the embodiments only, but not all of the embodiments. Based on the embodiments of the present disclosure, the people having ordinary skill in the art may obtain all other embodiments without any creative labor, and these embodiments are covered by the scope of the present disclosure.

Embodiment 1

Figure 1:
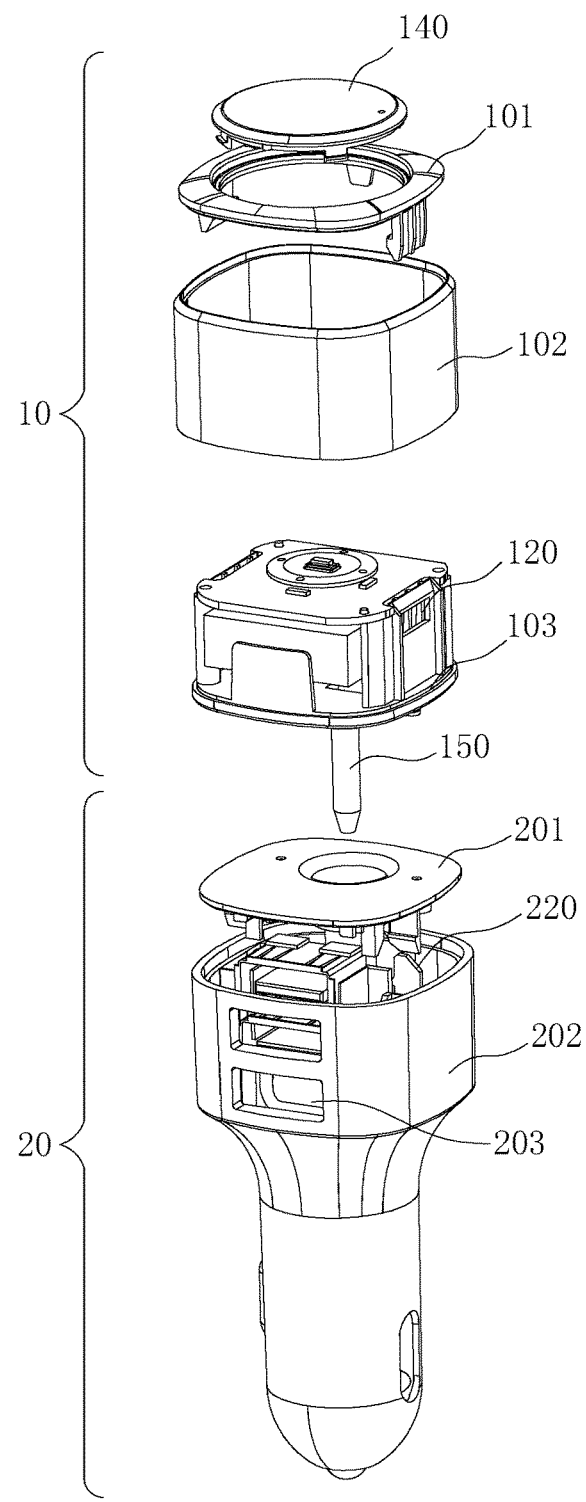
FIG. 1 is a schematic view of an automobile Bluetooth receiver in accordance with an embodiment of this disclosure.
Figure 2:
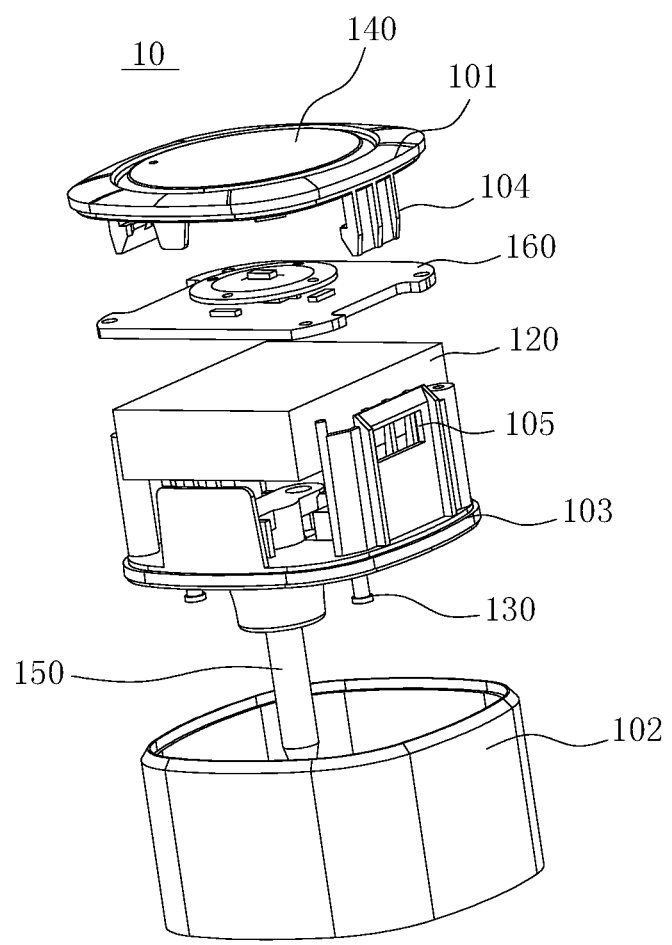
FIG. 2 is a schematic view of a Bluetooth receiver as shown in FIG. 1.

With reference to FIGS. 1 and 2 for an automobile Bluetooth receiver in accordance with the first embodiment of this disclosure, the automobile Bluetooth receiver comprises a Bluetooth receiver 10, and an automobile charger 20 for plugging the Bluetooth receiver 10 therein; and the Bluetooth receiver 10 comprises a receiver housing (101, 102,103) having an accommodating space formed therein, a Bluetooth receiver module and a rechargeable battery 120 installed in the receiver housing (101,102,103), a switch 140 installed on the receiver housing (101,102,103), and a first magnetic component 130 and a plug 150 installed at the bottom of the receiver housing (101,102,103), wherein the rechargeable battery 120 is electrically coupled to the Bluetooth receiver module, and the plug 150 is electrically coupled to the Bluetooth receiver module and the rechargeable battery 120.

The automobile charger 20 comprises an automobile charger housing (201,202) having an accommodating space formed therein, a PCB 220 with a charging circuit installed in the automobile charger housing (201,202), and a second magnetic component installed in an automobile charger housing (201,202) and attachable to the first magnetic component 130. The automobile charger housing (201,202) has a plug hole 204 formed thereon and disposed proximate to a side of the receiver housing (101,102,103) for receiving the plug 150, and the plug 150 is plugged into the plug hole 204 and electrically coupled to the PCB 220.

Compared with the conventional wired charging, this disclosure adopts a wireless separate plug for the charging, so as to make the charging process simpler and more convenient method and provide a convenient application. The issues of the Bluetooth receiver 10 and the automobile charger 20 being vibrated or shaken easily during the process of charging and two structures being dislocated easily to cause a low reliability of charging are taken into consideration, so that this disclosure has a first magnetic component 130 installed on the Bluetooth receiver 10 and a second magnetic component installed on the automobile charger 20, and the first and second magnetic components are magnetically attracted to each other to improve the reliability of the charging by the Bluetooth receiver 10 and the automobile charger 20.

The technical solution of this disclosure comprises a Bluetooth receiver 10, and an automobile charger 20 for plugging the Bluetooth receiver 10 therein. When the Bluetooth receiver 10 is detached, the Bluetooth receiver 10 may be plugged and connected directly to an output device without the Bluetooth function, so that the output device has the Bluetooth function to achieve the effects of listening music and making hand-free telephones. When both of the Bluetooth receiver and the automobile charger are plugged, a wireless charging can be accomplished. During the charging process, both of the Bluetooth receiver and the automobile charger can be positioned more securely by a magnetic effect, so as to achieve a reliable charging effect and a convenient use.

With reference to FIGS. 1 and 2 for an embodiment of this disclosure, the plug 150 is disposed at the middle of the bottom of the receiver housing (101,102,103), and the first magnetic component 130 is disposed on both sides of the plug 150. Further, the first magnetic component 130 includes two magnetic columns protruded from the bottom of the receiver housing (101,102,103), and the second magnetic component is disposed at the bottom of the plug hole 204.

In this preferred embodiment, the plug 150 may be designed at the middle of the bottom of the receiver housing (101,102,103) to facilitate its configuration corresponding to the plug hole 204 of the automobile charger top casing. Of course, the plug 150 may also be designed at a position near the middle of the bottom of the receiver housing (101,102, 103), so that the position of the plug hole 204 of the automobile charger housing (201,202) is corresponding to the position of the plug 150. To consider the fixation and appearance, the plug 150 is preferably designed at the middle of the bottom of the receiver housing (101,102,103).

Figure 3:
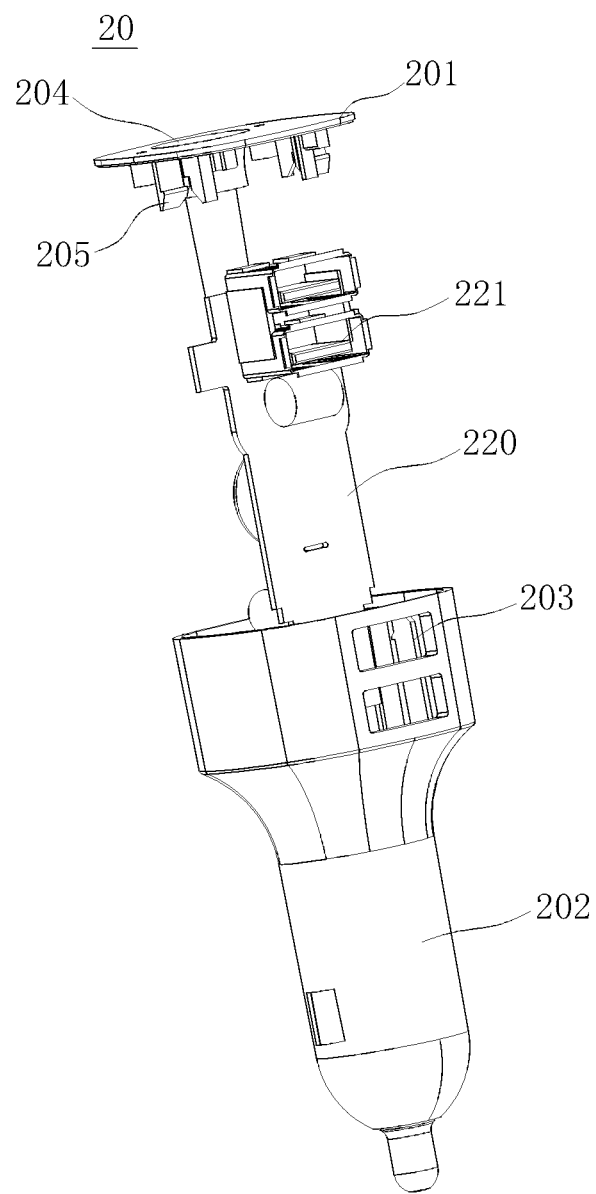
FIG. 3 is a schematic view of an automobile charger as shown in FIG. 1.

With reference to FIGS. 1 and 3 for an embodiment of this disclosure, the plug hole 204 has a diameter decreasing gradually in a direction towards the interior of the automobile charger housing (201,202), and the plug hole 204 has a stair formed on the inner wall of the plug hole 204.

In this embodiment, the wall of the plug hole 204 is substantially in an arc shape, and the hole is tapered from the outside to the inside, so that the plug 150 can be plugged easily. The stair in the plug hole 204 is provided for abutting the plug 150 when an end of the plug 150 is inserted. In an embodiment, the plug 150 is a DC3.5 plug connector.

Embodiment 2

With reference FIGS. 1 and 2 for an embodiment of this disclosure, the receiver housing (101,102,103) comprises a cylindrical body 102 with two end openings, a top casing 101 and a bottom casing 103, disposed at both ends of the cylindrical body 102 respectively, wherein the top casing 101 has a snap claw 104 extending towards a side of the bottom casing 103, and the bottom casing 103 has a snap hole 105 configured to be corresponding to the snap claw 104.

In this embodiment, the corners of the bottom casing 103 are formed into limiting columns, and these four limiting columns are capable of limiting the position of the rechargeable battery 120. To facilitate the assembling process, the top casing 101 and the bottom casing 103 are fixed by a snap-in structure. However, this disclosure is not just limited to this embodiment only, but any other arrangement such as latching, insertion, screw-connection may be used instead.

In an embodiment, the top casing 101 has a through hole formed thereon, and the switch 140 is partially exposed from the through hole.

In this embodiment, an end of the switch 140 is exposed from the top casing 101, so that users may press the switch 140 easily. To improve the waterproof function of the top casing 101, a soft part may be installed at the position of the top casing 101 corresponding to the switch 140, so that when the switch 140 is pressed, the soft part can be bent to reach the position of the switch 140.

In an embodiment, a pad 160 is installed between the top casing 101 and the rechargeable battery 120. The pad 160 is provided for preventing the rechargeable battery 120 from touching the top casing 101 directly and buffering the direct impact of the top casing 101 to the rechargeable battery 120 to protect the rechargeable battery 120.

Embodiment 3

With reference to FIGS. 1 and 3 for an embodiment of this disclosure, the automobile charger housing (201,202) comprises an automobile charger chassis 202 with an end opening, and an automobile charger top casing 201 covered onto the automobile charger chassis 202, and the automobile charger top casing 201 has a snap claw 205 formed on a side thereof and disposed proximate to the PCB 220, and the PCB 220 has a snap position configured to be corresponding to the snap claw 205 for snapping the snap claw 205 to the snap position.

In this embodiment, the automobile charger housing (201, 202), the automobile charger chassis 202, and the automobile charger top casing 201 are fixed by a snap-in structure. However, this disclosure is not just limited to this embodiment only, but any other arrangement such as latching, insertion, screw-connection may be used instead.

In an embodiment, the PCB 220 has at least one charging interface 221, and the automobile charger chassis 202 has a hole element 203 exposed from the charging interface 221. To improve the expandability, the automobile Bluetooth receiver 10 may be charged by an external smart device through the charging interface 221, so as to reduce the quantity of the charging interfaces 221.

While the disclosure has been described by means of specific embodiments, numerous modifications and variations could be made thereto by those skilled in the art without departing from the scope and spirit of the disclosure set forth in the claims.

What is claimed is:

1. An automobile Bluetooth receiver, comprising: a Bluetooth receiver, and an automobile charger for plugging the Bluetooth receiver therein; wherein the Bluetooth receiver comprises: a receiver housing having an accommodating space formed therein; a Bluetooth receiver module and a rechargeable battery, both being installed in the receiver housing; a switch installed onto the receiver housing; and a first magnetic component and a plug, both being installed at the bottom of the receiver housing; and the rechargeable battery is electrically coupled to the Bluetooth receiver module, and the plug is electrically coupled to the Bluetooth receiver module and the rechargeable battery; and the automobile charger comprises an automobile charger housing having an accommodating space formed therein, a PCB with a charging circuit installed in the automobile charger housing, and a second magnetic component installed in the automobile charger housing and attachable to the first magnetic component; and the automobile charger housing has a plug hole formed thereon and disposed proximate to a side of the receiver housing for receiving the plug, and the plug is plugged into the plug hole and electrically coupled to the PCB.

2. The automobile Bluetooth receiver of claim 1, wherein the plug is disposed at the middle of the bottom of the receiver housing, and the first magnetic component is disposed on both sides of the plug separately.

3. The automobile Bluetooth receiver of claim 2, wherein the first magnetic component includes two magnetic columns protruded from the bottom of the receiver housing, and the second magnetic component is disposed at the bottom of the plug hole.

4. The automobile Bluetooth receiver of claim 3, wherein the plug hole has a diameter decreasing gradually in a direction towards the interior of the automobile charger housing.

5. The automobile Bluetooth receiver of claim 3, wherein the plug hole has a stair formed on an inner wall of the plug hole.

6. The automobile Bluetooth receiver of claim 1, wherein the receiver housing comprises a cylindrical body with two end openings, a top casing and a bottom casing, disposed at both ends of the cylindrical body, respectively, and the top casing has a snap claw disposed on a side thereof and said side of the top casing facing towards the bottom casing, and the bottom casing has a snap hole formed thereon and configured to be corresponding to the snap claw.

7. The automobile Bluetooth receiver of claim 6, wherein the top casing has a through hole formed thereon, and the switch is partially exposed from the through hole.

8. The automobile Bluetooth receiver of claim 6, further comprising a pad installed between the top casing and the rechargeable battery.

9. The automobile Bluetooth receiver of claim 1, wherein the automobile charger housing comprises an automobile charger chassis with an opening at an end of the automobile charger chassis, and an automobile charger top casing covered onto the automobile charger chassis, and the automobile charger top casing has a snap claw formed on a side thereof and disposed proximate to the PCB, and the PCB has a snap position for latching the snap claw.

10. The automobile Bluetooth receiver of claim 9, wherein the PCB has at least one charging interface formed thereon; and the automobile charger chassis has a hole element for exposing the charging interface.

* * * * *